G. W. McKINNY.
VEHICLE BRAKE AND LOCK.
APPLICATION FILED JAN. 29, 1916.
1,199,584.
Patented Sept. 26, 1916.
2 SHEETS—SHEET 1.
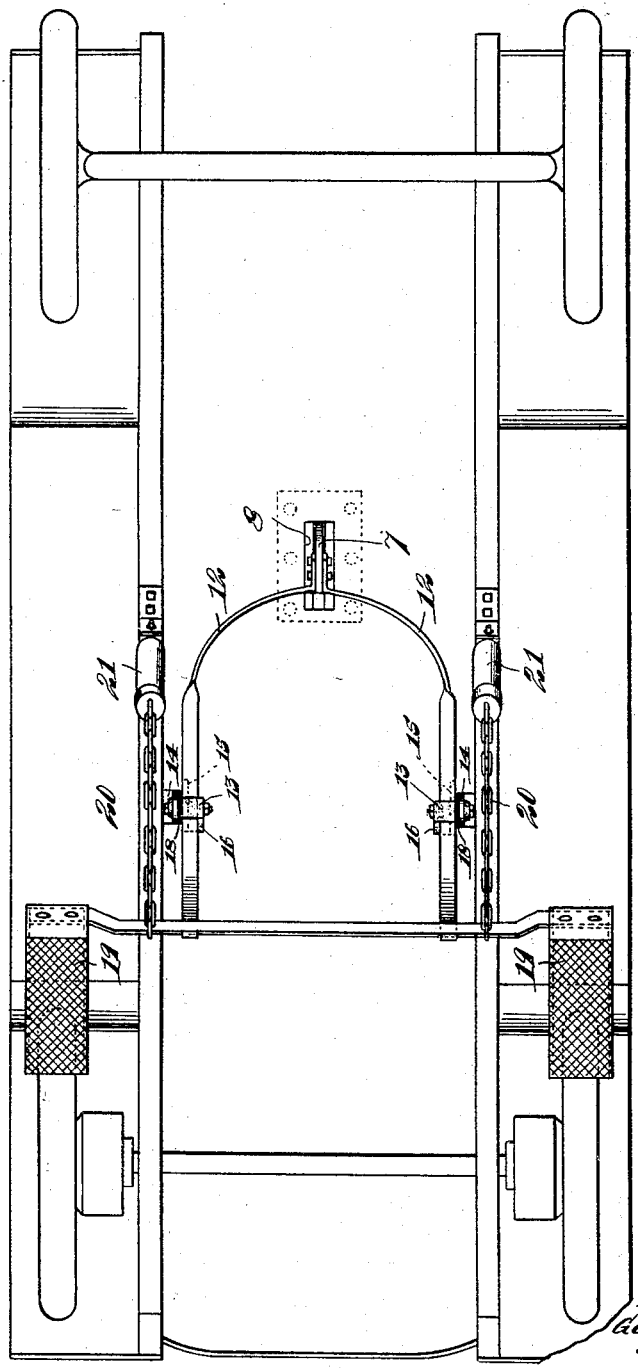

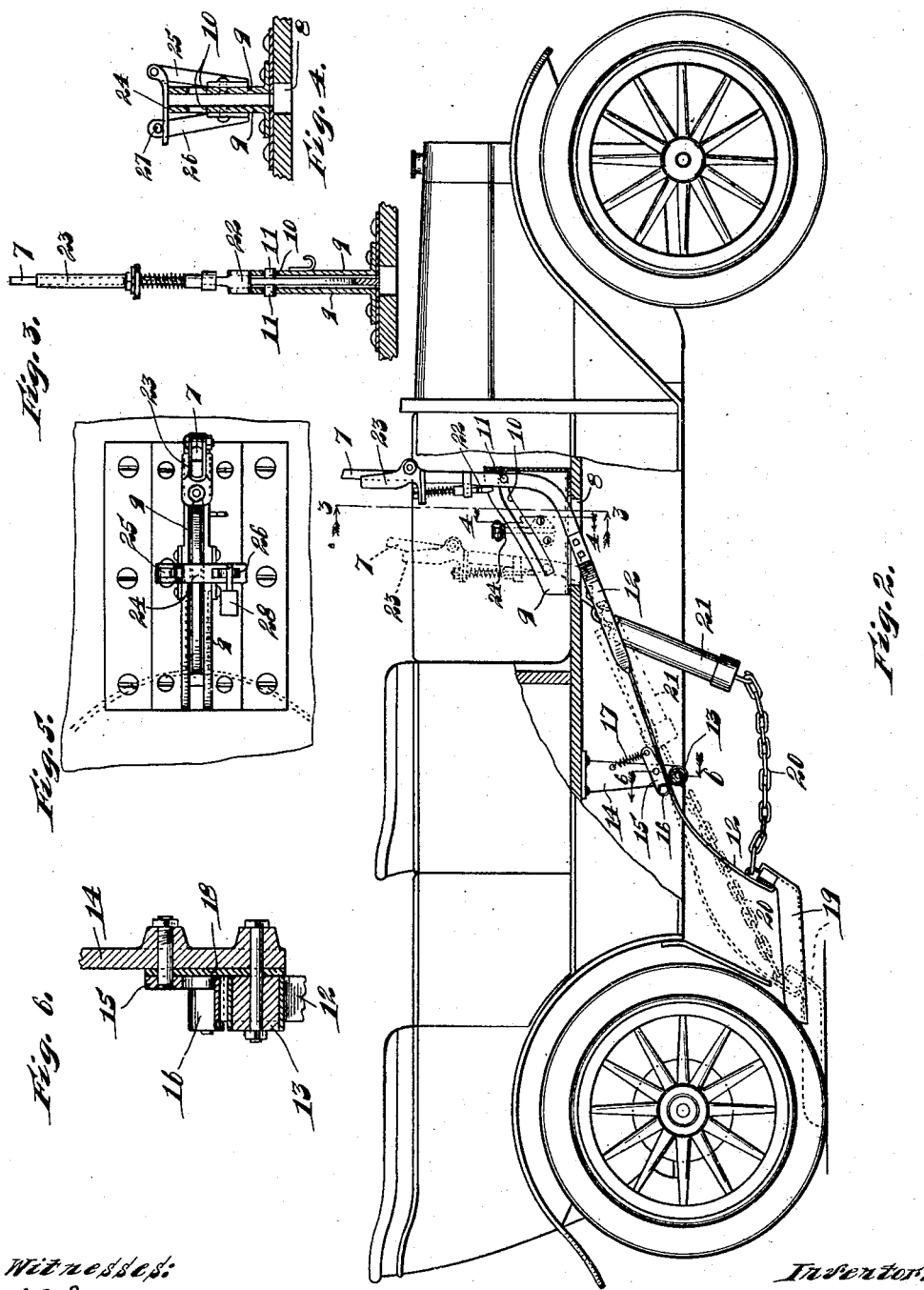

UNITED STATES PATENT OFFICE.

GEORGE W. McKINNY, OF CHICAGO, ILLINOIS.

VEHICLE BRAKE AND LOCK.

1,199,584.  Specification of Letters Patent.  Patented Sept. 26, 1916.

Application filed January 29, 1916.   Serial No. 75,021.

*To all whom it may concern:*

Be it known that I, GEORGE W. McKINNY, a citizen of the United States, and a resident of the city of Chicago, county of Cook, and State of Illinois, have invented certain new and useful Improvements in Vehicle Brakes and Locks, of which the following is a specification.

My invention relates to improvements in vehicle brakes and locks and has for its object the provision of an improved construction of this character especially adapted for use on automobiles, which is of simple construction and efficient in use.

The invention consists in the combinations and arrangements of parts hereinafter described and claimed.

The invention will be best understood by reference to the accompanying drawings forming a part of this specification, and in which, Figure 1 is a bottom plan view of an automobile equipped with a construction embodying my invention, Fig. 2, a side view of the automobile with portions broken away and shown in section, Fig. 3, an enlarged section taken on line 3—3 of Fig. 2, Fig. 4, an enlarged section taken on line 4—4 of Fig. 2, Fig. 5, a top plan view of an operating handle employed in the construction and its associated parts, and Fig. 6, an enlarged section taken on line 6—6 of Fig. 2.

The preferred form of construction, as illustrated in the drawings, comprises an operating handle 7 which is in substantially L-form and slides freely through a slot 8 formed in the bottom of the automobile body. A substantially channel-shaped housing 9 is arranged about lever 7 and slot 8 and is provided with guide slots 10 in its sides, the lever 7 being provided with pins 11 running in said slots, as indicated. Divergent operating bars 12 are secured to the lower end of lever 7 and ride on guide rollers 13 arranged on the inner sides of hangers 14 depending from the bottom of the automobile body. A lever 15 is fulcrumed on each of the hangers 14 and carries a roller 16 contacting with the upper side of the corresponding bar 12, said roller being yieldingly held to such contact by means of a spring 17. Each of the rollers 13 and 16 is covered with rubber and a rubber facing 18 is provided on each of the hangers 14 to prevent rattling of the bars 12.

At their lower ends the bars 12 carry brake-shoes 19 adapted to be inserted under the rear wheels of the automobile which act as an emergency brake therefor. Chains 20 are operatively connected with the brake-shoes 19 and with cushioning springs 20 in casings 21 to cushion the shock due to impact of said brake shoes, as will be readily understood.

Operating handle 7 is provided with a spring-held pawl or dog 22 adapted to engage corresponding notches provided in the upper edges of housing 9 and adapted to hold the handle 7 at its forward position or in position to hold the brakeshoes 19 in their inoperative positions, said pawl being controlled by a handle lever 23 on said handle. A locking bar 24 is pivoted at one end to a lug or ear 25 secured to one side of housing 9 and is provided with an opening at its other side adapted to pass over an ear 26 provided on the other side of said housing. The upper end of the ear 26 is perforated at 27 for the reception of a hasp of a padlock 28, as indicated in Fig. 5, said lock and bar serving as a means for locking the handle member 7 in its lowermost position with the brakeshoes under the wheels of the automobile, thus preventing surreptitious removal of the automobile.

The normal positions of the parts are those indicated in full lines in Fig. 2, with the exception that bar 24 is normally thrown back out of the way so as to permit of movement of said handle. In case of emergency, the brakeshoes 19 are released by grasping the handle 7 and handle lever 23, thus withdrawing pawl 22 from its notches and permitting of rearward movement of said handle. This rearward movement of the handle 7 throws the brakeshoes under the rear wheels of the automobile, as indicated in dotted lines in Fig. 2, thus effectually stopping the same. When it is desired to lock the automobile against surreptitious or unauthorized removal, bar 24 is swung across the channel member and lock 28 placed in position as indicated.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a vehicle, of a hanger thereon; a guide roller on said hanger; an operating bar riding on said guide roller; a spring pressed lever on said hanger; a roller on said lever coöperating with said guide roller to prevent rattling of said bar; and a brakeshoe controlled by said bar and insertible under a wheel of said vehicle, substantially as described.

2. The combination with a vehicle, of a brake-operating handle slidable through the bottom thereof; guides controlling the movements of said handle; and brakeshoes controlled by said handle, substantially as described.

3. The combination with a vehicle, of a brake-handle mounted on the body thereof; a brakeshoe operatively connected with said handle; a channel-shaped housing surrounding said handle and provided with guide slots; and pins on said handle running in said slots, substantially as described.

4. The combination with a vehicle, of a brake-handle mounted on the body thereof; a brakeshoe operatively connected with said handle; a channel-shaped housing surrounding said handle and provided with guide slots; pins on said handle running in said slots; and a spring-held pawl on said handle, there being a notch in said housing to receive said pawl to lock said handle in inoperative position, substantially as described.

In testimony whereof I have signed my name to this specification in the presence of two subscribing witnesses.

GEORGE W. McKINNY.

Witnesses:
JOSHUA R. H. POTTS,
CORA F. SCHIEBER.

Copies of this patent may be obtained for five cents each, by addressing the "Commissioner of Patents, Washington, D. C."